(12) United States Patent
Laslo (10) Patent No.: US 9,891,726 B1
(45) Date of Patent: Feb. 13, 2018

(54) STYLUS WITH TOUCH-SENSITIVE RETENTION CLIP

(71) Applicant: Microsoft Technology Licensing, LLC, Redmond, WA (US)

(72) Inventor: Ori Laslo, Rehovot (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/234,922

(22) Filed: Aug. 11, 2016

(51) Int. Cl.
| | |
|---|---|
| *G06F 3/038* | (2013.01) |
| *G06F 3/0354* | (2013.01) |
| *G06F 3/044* | (2006.01) |
| *G06F 3/045* | (2006.01) |
| *G06F 3/0362* | (2013.01) |
| *G06F 1/32* | (2006.01) |

(52) U.S. Cl.
CPC .......... *G06F 3/0383* (2013.01); *G06F 3/0362* (2013.01); *G06F 3/03545* (2013.01); *G06F 3/044* (2013.01); *G06F 3/045* (2013.01); *G06F 1/3231* (2013.01); *G06F 1/3259* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 5,473,464 A * | 12/1995 | Knowles | H01S 5/042 359/237 |
| 5,754,645 A | 5/1998 | Metroka et al. | |
| 6,702,500 B1 | 3/2004 | Haffner et al. | |
| 7,663,509 B2 | 2/2010 | Shen | |
| 8,527,879 B2 | 9/2013 | Symons et al. | |
| 9,013,412 B2 | 4/2015 | Junk | |
| 9,459,710 B1 * | 10/2016 | Brand | G06F 3/03545 |
| 2005/0207823 A1 * | 9/2005 | Adams | G06F 3/03545 401/195 |
| 2007/0205996 A1 * | 9/2007 | Huang | G06F 3/03545 345/179 |

(Continued)

FOREIGN PATENT DOCUMENTS

WO    03058394 A2    7/2003

OTHER PUBLICATIONS

Krause, Kevin, "12 Galaxy Note 4 S Pen Tips & Tricks", Published on: Feb. 5, 2015 Available at: http://phandroid.com/2015/02/05/galaxy-note-4-s-pen-tips-tricks/.

(Continued)

*Primary Examiner* — Priyank Shah
(74) *Attorney, Agent, or Firm* — Alleman Hall Creasman & Tuttle LLP (57) ABSTRACT

A stylus includes an elongate gripping member terminating at a writing tip, a communication interface housed within the elongate gripping member, a touch-sensitive retention clip extending from the elongate gripping member, and a controller housed within the elongate gripping member. The communication interface is configured to wirelessly communicate with a computing device. The controller is configured to detect a position or movement of a finger along a length of the touch-sensitive retention clip, and send to the computing device, via the communication interface, information based on the position or movement of the finger along the length of the touch-sensitive retention clip.

20 Claims, 7 Drawing Sheets

(56) References Cited

U.S. PATENT DOCUMENTS

| 2011/0164000 | A1* | 7/2011 | Pance | G06F 3/03545 |
| | | | | 345/179 |
| 2014/0078116 | A1* | 3/2014 | Mercea | G06F 1/266 |
| | | | | 345/179 |
| 2015/0363013 | A1* | 12/2015 | Coutts | G06F 3/03545 |
| | | | | 345/179 |
| 2017/0262085 | A1* | 9/2017 | Askew | G06F 3/044 |

OTHER PUBLICATIONS

"Getting to Know Your Palm Device", Published on: Dec. 10, 2008 Available at: http://www.dummies.com/how-to/content/getting-to-know-your-palm-device.html.

"Photoshop: Layers and brush presets scrolling by 'pan/scroll' stylus button", Retrieved on: Mar. 23, 2016 Available at: https://feedback.photoshop.com/photoshop_family/topics/layers_and_brush_presets_scrolling_by_pan_scroll_stylus_button.

"How can I scroll with the Pen?", Retrieved on: Mar. 23, 2016 Available at: https://www.reddit.com/r/Surface/comments/2p7pb0/how_can_i_scroll_with_the_pen/.

Chesler, Moriah, "Will a Stylus Pen Work With an iPhone?", Published on: Sep. 23, 2015 Available at: http://science.opposingviews.com/stylus-pen-work-iphone-12677.html.

"International Search Report and Written Opinion Issued In PCT Application No. PCT/US2017/045206", dated Oct. 30, 2017, 13 Pages.

* cited by examiner

STYLUS WITH TOUCH-SENSITIVE RETENTION CLIP

BACKGROUND

A stylus may be used to provide precise touch input to a touch sensing device. In particular, a stylus may be shaped to mimic a traditional writing utensil, such as a pen or pencil, thus allowing a user to provide accurate touch input in a familiar manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A stylus includes an elongate gripping member terminating at a writing tip, a communication interface housed within the elongate gripping member, a touch-sensitive retention clip extending from the elongate gripping member, and a controller housed within the elongate gripping member. The communication interface is configured to wirelessly communicate with a computing device. The controller is configured to detect a position or movement of a finger along a length of the touch-sensitive retention clip, and send to the computing device, via the communication interface, information based on the position or movement of the finger along the length of the touch-sensitive retention clip.

BRIEF DESCRIPTION OF THE DRAWINGS

FIGS. 3A-5B show differently configured capacitive touch-sensitive retention clips that may be implemented in a stylus.

DETAILED DESCRIPTION

A stylus allows a user to interact with the display of a computing device via touch input. However, in some cases, touch input on the display may not be the most convenient form of user interaction with a computing device. For example, in order to perform a scrolling operation with a stylus via touch input, a user may have to touch the stylus to a scroll bar that is visually presented on a touch-sensitive display. In doing so, the user may have to make small and precise adjustments to the scroll bar that may be difficult to perform. In contrast, a scroll wheel of a mouse device may provide faster and more convenient scrolling functionality for document reading, internet browsing, and other computing device interactions. As such, a user may choose to use a mouse device to interact with a computing device, instead of, or in addition to using a stylus.

Accordingly, the present disclosure is directed a stylus that includes a touch-sensitive retention clip. The stylus may be configured to detect a position or movement of a finger along a length of the retention-clip. Further, the stylus may be configured to send information to a computing device based on the detected position or movement of the finger along the length of the touch-sensitive retention clip. As the finger changes position or moves along the length of the retention clip, the information that is sent to the computing device changes to reflect the change in position. Such information may be used by the computing device to effectuate computing operations, such as scrolling or zooming operations. By providing a touch-sensitive retention clip on the stylus, the stylus is able to provide scrolling, zooming, and/or other computing functionality in a manner that is similar to a scroll wheel of a mouse device. As such, a user may forgo using a mouse device in favor of the stylus when interacting with a computer.

Figure 1:
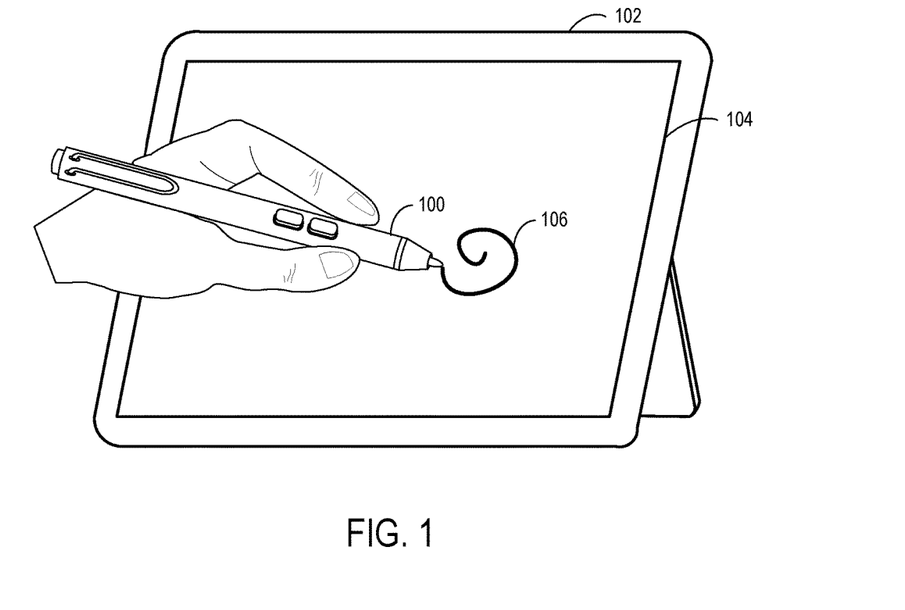
FIG. 1 shows a stylus providing touch input to a touch-sensitive display device.

FIG. 1 shows a stylus 100 interacting with a touch-sensitive display device 102. The touch-sensitive display device 102 includes a touch sensor 104 configured to detect touch input from one or more touch sources, such as the stylus 100. The touch sensor 104 may be configured to detect active and/or passive touch input, and the stylus 100 may be cooperatively configured to provide active and/or passive touch input. When active touch input is enabled, the stylus 100 may be configured to generate an electrical signal that is detected by the touch sensor 104. In other implementations, the stylus 100 may be configured to provide passive touch input in which the stylus 100 does not produce an electrical signal corresponding to touch input. In another example, the touch sensor 104 may be configured to detect passive touch input from a finger of a user. The touch sensor 104 may be configured to receive input from input sources in direct contact with a surface of the touch-sensitive display device 102, and/or, input from input sources not in direct contact with the touch-sensitive display device 102 (e.g., input devices that hover proximate to a surface of the display). "Touch input" as used herein refers to both types of input. The touch sensor 104 may take any suitable form including, but not limited to, one or more of a capacitive touch sensor and/or display, a resistive touch sensor and/or display, and an optical touch sensor and/or display. In one example, the touch sensor 104 includes a matrix of electrodes that form capacitors whose capacitances may be evaluated in detecting touch input.

Furthermore, the stylus 100 may be configured to provide user input to the touch-sensitive display device 102 in forms other than direct touch input that is detected by the touch sensor 104. The touch-sensitive display device 102 may be configured to visually present appropriate graphical output 106 in response to receiving information from the stylus 100. Such information may be based on touch input as well as other user input. While described with reference to a touch-sensitive display device, stylus 100 may optionally be used with touch-sensing surfaces that do not include display functionality.

Figure 2:
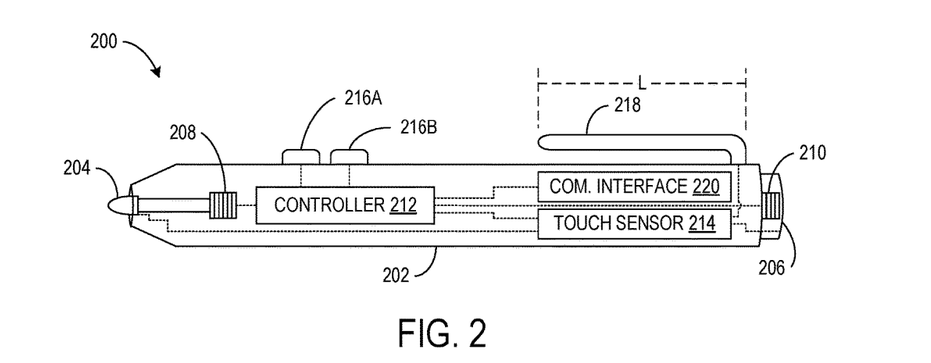
FIG. 2 shows a stylus including a touch-sensitive retention clip.

FIG. 2 schematically shows a stylus 200 including mechanisms that enable various forms of user input to a computing device, such as the touch-sensitive display device 102 of FIG. 1. The stylus 200 is an example of the stylus 100 of FIG. 1. The stylus 200 is an active stylus shown in simplified form. The stylus 200 includes an elongate gripping member 202 terminating at an electrode writing tip 204 on one end and an electrode eraser 206 on an opposing end. The elongate gripping member 202 is cylindrical. However, the elongate gripping member 202 may assume any suitable size and/or shape. The electrode writing tip 204 and the electrode eraser 206 may be electrically conductive and configured to receive current when proximate to a driven electrode of a touch sensor, such as touch sensor 104 of FIG. 1.

In some implementations, the electrode writing tip 204 includes a pressure sensor 208 configured to detect a pressure when the electrode writing tip 204 is pressed against a surface. Likewise, the electrode eraser 206 includes a pressure sensor 210 configured to detect a pressure when the electrode eraser 206 is pressed against a surface. In one example, each of the pressure sensors 208 and 210 are force sensitive resistors. A touch pressure value of each of the respective pressure sensors 208 and 210 may be sent to a controller 212 that is housed in the elongate gripping member 202. The controller 212 may be configured to derive touch input information from the output of the pressure sensors 208 and 210.

The stylus 200 may be configured to operate in a receive mode and a drive mode. The receive mode may be employed (1) to synchronize the stylus 200 with a computing device/touch sensor to establish/maintain a shared sense of time; and (2) to establish a position (e.g., the Y coordinate of an electrode matrix or the X coordinate in the event of vertically-oriented rows) of the stylus 200 with respect to the touch sensor. During the receive mode, the touch sensor drives row electrodes of the electrode matrix to generate a position signal that is received by the electrode writing tip 204 or electrode eraser 206 of the stylus 200. During the drive mode, the stylus 200 may drive the electrode writing tip 204 or the electrode eraser 206 to generate an electrical signal corresponding to touch input. The electrical signal may influence electrical conditions on one or more column electrodes of the electrode matrix of the touch sensor to, thereby establish the X position of the stylus 200 relative to the touch sensor. In particular, the shared sense of timing between the stylus 200 and the touch-sensitive display device allows the stylus 200 and the touch-sensitive display device to know which row of the electrode matrix the stylus 200 was closest to, thereby establishing the Y position of the stylus 200.

Furthermore, the stylus 200 includes user input mechanisms other than touch input mechanisms (e.g., electrode tip and electrode eraser) that enable touch input to be provided directly to a touch-sensitive surface of a touch-sensitive display device. In particular, the stylus 200 includes barrel switch buttons 216A and 216B, and a touch-sensitive retention clip 218, each of which are operatively coupled to the controller 212.

The barrel switch buttons 216A and 216B protrude from the elongate gripping member 202. The barrel switch buttons 216A and 216B are configured to be depressable to provide user input. In particular, a state (e.g., depressed or undepressed) of each barrel switch button 216A. 216B may be sent to the controller 212. The state of the barrel switch buttons 216A and 216B may correspond to any suitable user input information.

The touch-sensitive retention clip 218 extends from the elongate gripping member 202. The touch-sensitive retention clip 218 mechanically functions to physically retain the stylus 200 to another object. For example, the touch-sensitive retention clip 218 may temporarily couple the stylus to a user's pocket, a mobile device, or other object in order for a user to keep track of the stylus 200.

Furthermore, the touch-sensitive retention clip 218 is electrically connected to a touch sensor 214 to enable detection of touch input on a surface of the touch-sensitive retention clip 218. In particular, a presence of a finger on the touch-sensitive retention clip 218 may influence an electrical signal measured by the touch sensor 214. The controller 212 may be configured to receive the electrical signal measured by the touch sensor 214, and detect touch input by the finger on the touch-sensitive retention clip 218 based on the measured electrical signal. The detected touch input provided by the finger on the touch-sensitive retention clip 218 may correspond to any suitable user input information useable by a computing device to effectuate any suitable computing operation. Non-limiting examples of such information include, but are not limited to position information, movement information, gesture information (e.g., scroll direction and speed), and sensor signal information.

In the depicted implementation, the touch sensor 214 is housed in the elongate gripping member 202. In other implementations, the touch sensor 214 instead may be integrated into the touch-sensitive retention clip 218.

In some implementations, the touch sensor 214 may include a capacitive sensor configured to measure a capacitance of the touch-sensitive retention clip 218. In such implementations, the controller 212 is configured to detect the position of the finger or movement of the finger along the length of the touch-sensitive retention clip 218 based on the capacitance measured by the capacitive sensor. In one example, the capacitance may be measured between the interior conductive material and ground. In another example, the capacitance may be measured between two different interior conductive materials having different electrical conductivities.

In other implementations, the touch sensor 214 may include a resistive sensor configured to measure a resistance of the touch-sensitive retention clip 218. In such implementations, the controller 212 is configured to detect the position of the finger along the length of the retention clip based on the resistance measure by the resistive sensor. In one example, the resistance may be measured between two resistive electrodes.

Furthermore, in some implementations, the touch-sensitive retention clip 218 may include a plurality of different materials having different electrical properties. The shape of one or more of the plurality of materials may vary over a length (L) of the touch-sensitive retention clip 218. Such material changes may enable a position of the finger along the length (L) of touch-sensitive retention clip 218 to be detected by the controller 212. In particular, the electrical signal measured by the touch sensor 214 may vary relative to the position of the finger along the length (L) of the touch-sensitive retention clip 218. Different configurations of the touch-sensitive retention clip 218 that enable such finger position detection are discussed in further detail below with reference to FIGS. 3-6.

The detected touch input provided by the finger on the touch-sensitive retention clip 218 may correspond to any suitable user input information useable by a computing device to effectuate any suitable computing operation. In one example, the barrel switches 216A and 216B, and the touch-sensitive retention clip 218 mimic at least some of the functionality of a mouse device. In particular, user input information derived from user interaction with the barrel switches 216A and 216B may be interpreted by a computing device to produce control commands similar to left and right buttons of a mouse device, and user input information derived from user interaction with the touch-sensitive retention clip 218 may be interpreted by a computing device to produce control commands similar to a scroll wheel of a mouse device.

The stylus 200 may transmit information (e.g., touch input/position or movement information, other user input information, stylus information) to the touch-sensitive display device via a communication interface 220. The communication interface 220 is configured to communicatively couple the stylus 200 with one or more touch-sensitive display devices or other computing devices. The communication interface 220 may be housed in the elongate gripping member 202. The communication interface 220 may include any suitable wireless communication hardware. In one example, the communication interface 220 includes a personal area network transceiver (e.g., a Bluetooth transceiver). In another example, the communication hardware establishes an electrostatic communication channel between the stylus 200 and a touch-sensitive display device through a capacitive coupling of the electrode writing tip 204 or the electrode eraser 206 and one or more electrodes of a touch sensor of the touch-sensitive display device. The communication interface 220 may employ any suitable type and/or number of different communication protocols to communicatively couple the stylus 200 with a touch-sensitive display device or other computing device.

The controller 212 may include any suitable computing hardware. In one example, the controller 212 includes a logic machine and a storage machine configured to hold instructions executable by the logic machine to perform various operations discussed herein. Such computing componentry is discussed in further detail below with reference to FIG. 9.

In one example, the controller 212 may be configured to detect a position or movement of a finger along a length of the touch-sensitive retention clip 218 based on an electrical signal measured by the touch sensor 214, and send to a computing device, via the communication interface 220, information based on the position or movement of the finger along the length of the touch-sensitive retention clip 218. The information may correspond to any suitable control command. In one example, the information associated with the detected position or movement of the finger on the touch-sensitive retention clip 218 includes zoom information useable by the computing device to effectuate a zooming operation, an example of which is discussed in further detail below with reference to FIG. 8. In another example, the information associated with the detected position or movement of the finger on the touch-sensitive retention clip 218 corresponds to a scrolling operation, an example of which is discussed in further detail below with reference to FIG. 9.

In some implementations, the controller 212 may be configured to maintain the stylus 200 in a power saving mode in which the stylus 200 does not communicate with a computing device via the communication interface 220. Further, the controller 212 may be configured to, in response to detecting a gesture or movement of a finger on the touch-sensitive retention clip 218, switch the stylus 200 from the power saving mode to an active mode in which the stylus 200 communicates with the computing device via the communication interface 220 based on detecting the finger on the touch-sensitive retention clip 218. A gesture may include any suitable movement of the finger on the touch-sensitive retention clip that is recognized by the stylus 200. Such movements may be associated with a defined meaning.

In some implementations, the controller 212 may be configured to detect a touch by a finger on the touch-sensitive retention clip 218 based on an electrical signal measured by the touch sensor 214. The controller 212 may be configured to determine that the touch is an intentional touch based on the electrical signal corresponding to a sliding movement of the finger along the length of the retention clip. The controller 212 may be configured to determine that the touch is an incidental touch based on the measured electrical signal corresponding to a static position of the finger on the touch-sensitive retention clip 218 for greater than a threshold duration. If the controller 212 determines that the touch is an incidental touch, then the controller 212 may be configured to ignore the incidental touch by not sending information to the computing device based on the position of the finger corresponding to the incidental touch.

The controller 212 may be configured to perform any suitable operations based on detecting touch input along the length of the touch-sensitive retention clip 218.

FIGS. 3-6 show different configurations of a touch-sensitive retention clip that enable variable position sensing of a finger along a length of the touch-sensitive retention clip. The different configurations may be employed in a stylus, such as the stylus 200 of FIG. 2.

Figure 3A:
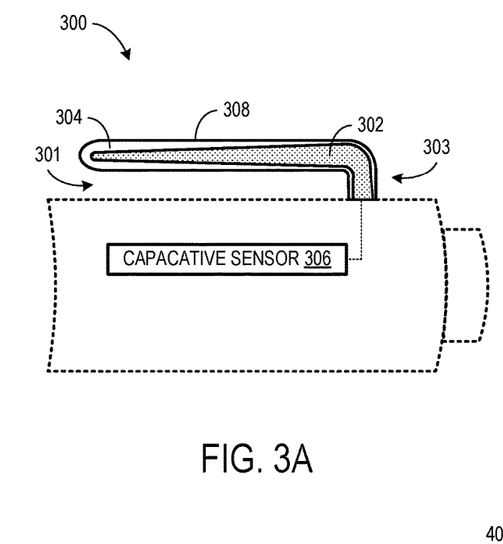
Figure 3B:
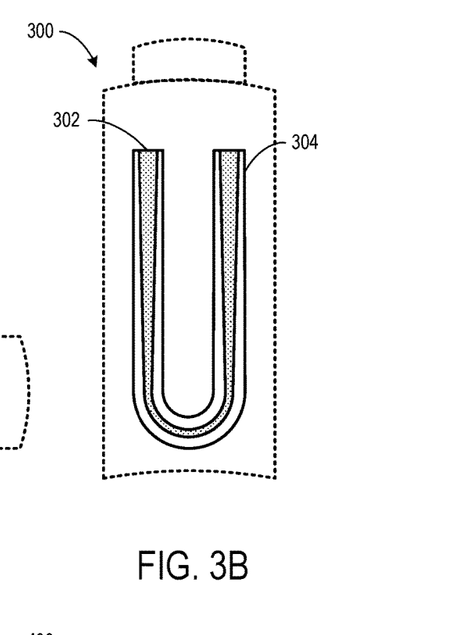

FIG. 3A shows a side view and FIG. 3B shows a plan view of a touch-sensitive retention clip 300 in the form of a wire having a "U" shape. The touch-sensitive retention clip 300 has a length extending between a tip end 301 and an eraser end 303. The touch-sensitive retention clip 300 couples to the elongate gripping member of the stylus at the eraser end 303. The touch-sensitive retention clip 300 includes an interior conductive material 302 and an exterior isolating material 304 that surrounds the interior conductive material 302. The interior conductive material 302 has a greater electrical conductivity than the exterior isolating material 304. The interior conductive material 302 may include any suitable conductive or partially conductive material. The exterior isolating material 304 may include any suitable low conductivity material. For example, the exterior isolating material 304 may include any sort of plastic, paint, or other electrically-isolating coating.

As depicted in FIG. 3A, a thickness of the interior conductive material 302 changes along a length of the touch-sensitive retention clip 300. In particular, a thickness of the internal conductive material 302 decreases moving along the length of the touch-sensitive retention clip 300 in the direction of the tip end 301. Correspondingly, a thickness of the exterior isolating material 304 increases moving along the length of the touch-sensitive retention clip 300 in the direction of the tip end 301. The interior conductive material 302 and the exterior isolating material 304 cooperatively change shape along the length of the touch-sensitive retention clip 300 to maintain a consistent external shape along the length of the touch-sensitive retention clip 300. The external shape of the touch-sensitive retention clip 300 may take any suitable form (e.g., circular, rectangular).

The interior conductive material 302 is electrically connected to a capacitive sensor 306. The capacitive sensor 306 is configured to measure a capacitance of the touch-sensitive retention clip 300 relative to a ground of the stylus. As shown in FIG. 3A, because a distance between the interior conductive material 302 and a surface 308 of the touch-sensitive retention clip 300 varies along the length, the measured capacitance varies based on a position of a finger along the length of the touch-sensitive retention clip 300. For example, if a finger is positioned towards the eraser end 303 where the internal conductive material 302 is thicker, the measured capacitance may be greater than a measured capacitance when the finger is positioned towards the tip end 301. In particular, because the finger is closer to the internal conductive material 302 at the eraser end 303, the finger draws more current and correspondingly increases the measured capacitance. In this manner, variable touch input information may be provided based on a position of a finger along the length of the touch-sensitive retention clip 300.

In other implementations, the thickness of the internal conductive material 302 may increase moving along the length of the touch-sensitive retention clip 300 in the direction of the tip end 301, and the thickness of the exterior isolating material 304 may decrease moving along the length of the touch-sensitive retention clip 300 in the direction of the tip end 301.

Figure 4A:
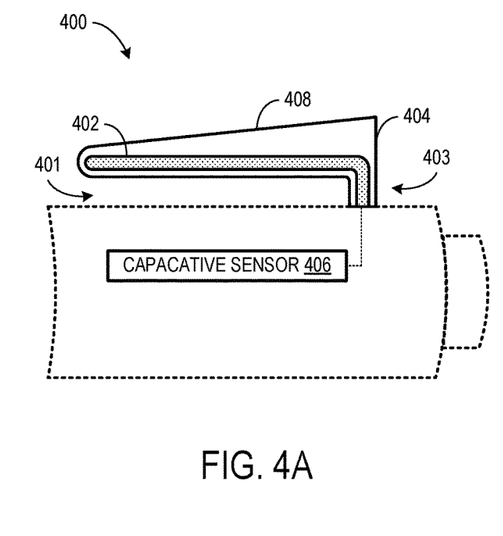
Figure 4B:
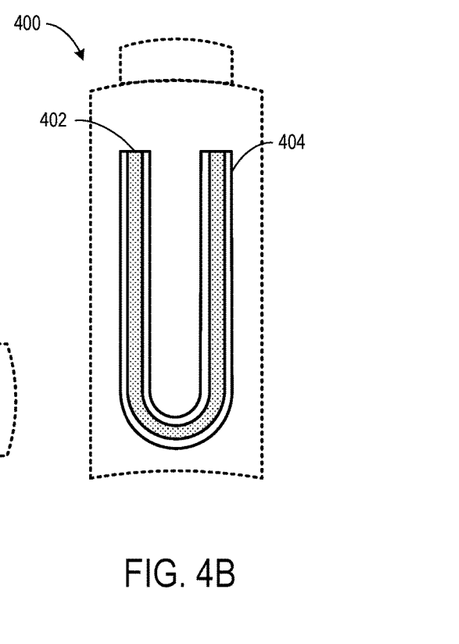

FIG. 4A shows a side view and FIG. 4B shows plan view of a touch-sensitive retention clip 400 in the form of a wire having a "U" shape. The touch-sensitive retention clip 400 has a length extending between a tip end 401 and an eraser end 403. The touch-sensitive retention clip 400 couples to the elongate gripping member of the stylus at the eraser end 401. The touch-sensitive retention clip 400 includes an interior conductive material 402 and an exterior isolating material 404 that surrounds the interior conductive material 402. The interior conductive material 402 and the exterior isolating material 404 may have the same or similar electrical properties as the interior conductive material 302 and the exterior isolating material 304 of FIG. 3.

As shown in FIG. 4A, a thickness of the interior conductive material 402 remains consistent along a length of the touch-sensitive retention clip 400. However, a thickness of the exterior isolating material 404 decreases moving along the length of the touch-sensitive retention clip 400 in the direction of a tip end 401. In other words, the exterior isolating material 404 is thicker at an eraser end 403 than at the tip end 401. Due to the varying thickness of the exterior isolating material 404 along the length of the touch-sensitive retention clip 400, an external/overall thickness of the touch-sensitive retention clip 400 varies along the length.

The interior conductive material 402 is electrically connected to a capacitive sensor 406. The capacitive sensor 406 is configured to measure a capacitance of the touch-sensitive retention clip 400 relative to a ground of the stylus. As shown in FIG. 4A, because a distance between the interior conductive material 402 and a surface 408 of the touch-sensitive retention clip 400 varies along the length, the measured capacitance varies based on a position of a finger along the length of the touch-sensitive retention clip 400. For example, if a finger is positioned towards the tip end 401 where the external isolating material 404 is thinner, the measured capacitance may be greater than a measured capacitance when the finger is positioned towards the eraser end 403. In particular, because the finger is closer to the internal conductive material 402 at the tip end 401, the finger draws more current and correspondingly increases the measured capacitance. In this manner, variable touch input information may be provided based on a position of a finger along the length of the touch-sensitive retention clip 400.

In other implementations, the thickness of the external conductive material 404 may increase moving along the length of the touch-sensitive retention clip 400 in the direction of the tip end 401.

Figure 5A:
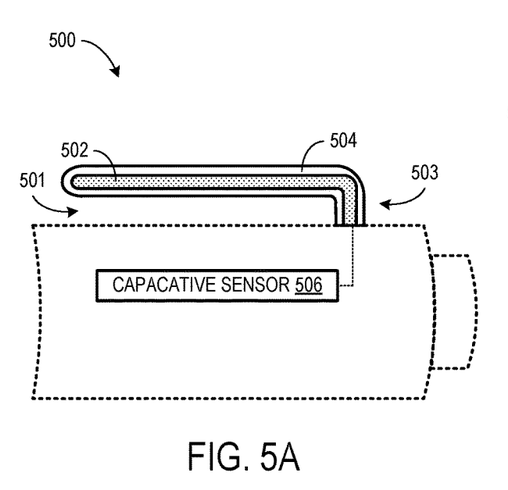
Figure 5B:
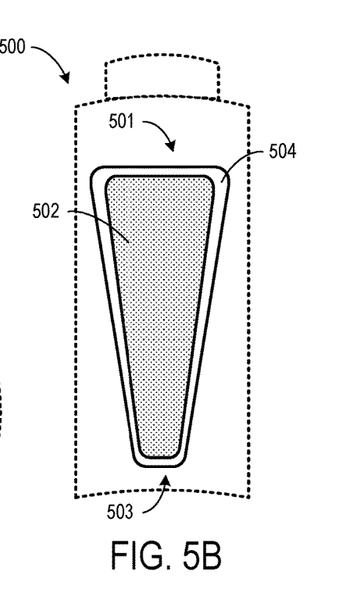

FIG. 5A shows a side view and FIG. 5B shows a plan view of a touch-sensitive retention clip 500 having a trapezoidal shape. The touch-sensitive retention clip 500 has a length extending between a tip end 501 and an eraser end 503. The touch-sensitive retention clip 500 couples to the elongate gripping member of the stylus at the eraser end 503. The touch-sensitive retention clip 500 includes an interior conductive material 502 and an exterior isolating material 504 that surrounds the interior conductive material 502. The interior conductive material 502 and the exterior isolating material 504 may have the same or similar electrical properties as the interior conductive material 302 and the exterior isolating material 304 of FIG. 3.

As shown in FIG. 5A, a thickness of the interior conductive material 502 and a thickness of the exterior isolating material 504 both remain consistent along the length of the touch-sensitive retention clip 500. However, due to the trapezoidal shape, as shown in FIG. 5B, a width of the interior conductive material 502 decreases moving along the length from the eraser end 503 to the tip end 501. Due to the consistent thickness and varying width of the interior conductive material 502 along the length of the touch-sensitive retention clip 500, an overall amount of the interior conductive material 502 varies along the length.

The interior conductive material 502 is electrically connected to a capacitive sensor 506. The capacitive sensor 506 is configured to measure a capacitance of the touch-sensitive retention clip 500 relative to a ground of the stylus. Because the overall amount of the interior conductive material 502 varies along the length, the measured capacitance varies based on a position of a finger along the length of the touch-sensitive retention clip 500. For example, if a finger is positioned towards the eraser end 503 where the internal conductive material 502 is wider, the measured capacitance may be greater than a measured capacitance when the finger is positioned towards the tip end 501. In particular, because the finger interacts with a greater amount of the internal conductive material 402 at the eraser end 503, the finger draws more current and correspondingly increases the measured capacitance. In this manner, variable touch input information may be provided based on a position of a finger along the length of the touch-sensitive retention clip 500.

Any suitable dimension of the touch-sensitive retention clip (or a particular material(s) of the touch-sensitive retention clip) may change along the length of the touch-sensitive retention clip to enable detection of a position of a finger along the length of the touch-sensitive retention clip. Moreover, multiple different dimensions of the touch-sensitive retention clip (or a particular material(s) of the touch-sensitive retention clip) may change along the length of the touch-sensitive retention clip to enable detection of a position of a finger along the length of the touch-sensitive retention clip. For example, a thickness of the internal conductive material and a thickness of the external isolating material may change of the length of the touch-sensitive retention clip.

Figure 6A:
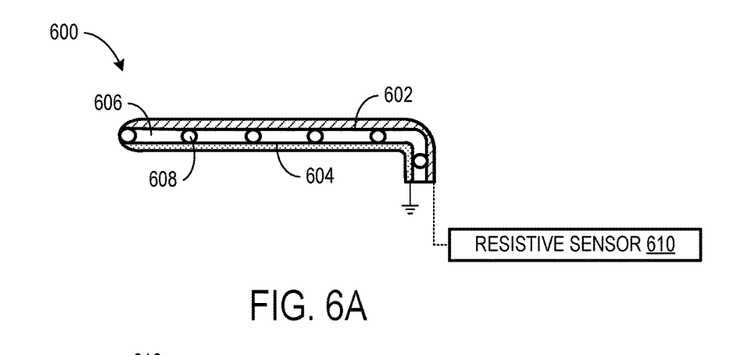
FIGS. 6A and 6B show a resistive touch-sensitive retention clip that may be implemented in a stylus.
Figure 6B:
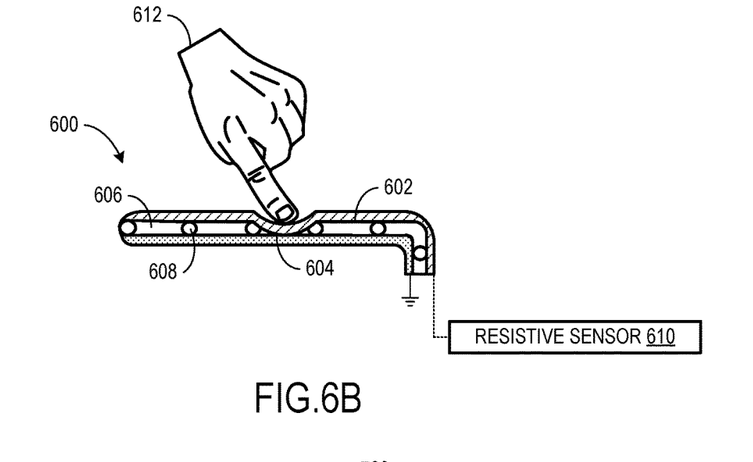

FIGS. 6A and 6B show a touch-sensitive retention clip 600 configured to resistively detect touch input. The touch-sensitive retention clip 600 includes a surface layer 602 spaced apart from a base layer 604 by a gap 606. The surface layer 602 and the base layer 604 include conductive material. Further, the gap 606 includes a plurality of isolating spacers 608 configured to prevent the surface layer 602 from contacting the base layer 604 when no touch input is applied to the touch-sensitive retention clip 600. The surface layer 602 is electrically connected to a resistive sensor 610 configured to measure a voltage corresponding to a resistance of the touch-sensitive retention clip 600. The surface layer 602 is deformable based on touch input applied to the surface layer 602, such that the surface layer 602 contacts the base layer 604 to change the resistance measured by the resistive sensor 610.

In FIG. 6A, no touch input is applied to the touch-sensitive retention clip 600, so the surface layer 602 does not contact the base layer 604. In this state, the resistive sensor 610 measures a first voltage that indicates no touch input. In FIG. 6B, a finger 612 applies touch input to the surface layer 602 that causes the surface layer 602 to deform through the gap 606 to contact the base layer 604. When the surface layer 602 contacts the base layer 604, electrical current flows between the two layers to change the voltage measured by the resistive sensor 610 to a second voltage. A controller of the stylus may receive the voltage measurements of the resistive sensor 610, and detect a position of the finger 612 along the length of the touch-sensitive retention clip 600 based on voltage measured by the resistive sensor 610.

Further, the controller may infer a position of the finger along the length of the touch-sensitive retention clip 600 based on a change in voltage. For example, if the finger 612 applies touch input toward the open end of the touch-sensitive retention clip 600, current flows through the surface layer 602 for a first distance to reach the resistive sensor 610. That first distance corresponds to a first resistance that affects the voltage measured by the resistive sensor 610. Further, if the finger 612 applies touch input toward the connected end of the touch-sensitive retention clip 600, current flows through the surface layer 602 for a second distance that is shorter than the first distance to reach the resistive sensor 610. This shorter second distance corresponds to a second resistance that is lower than the first resistance. Accordingly, the touch input applied towards the open end may have greater change in measured voltage relative to the touch input applied towards the connected end. In this manner, variable touch input information may be provided based on a position of a finger along the length of the touch-sensitive retention clip 600.

Figure 7:
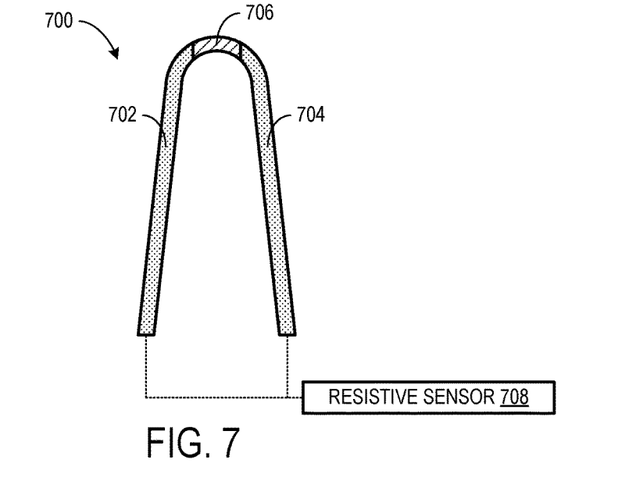
FIG. 7 shows a resistive touch-sensitive retention clip that may be implemented in a stylus.

FIG. 7 shows another touch-sensitive retention clip 700 configured to resistively detect touch input. The touch-sensitive retention clip 700 includes a first electrode 702 and a second electrode 704. The first and second electrodes 702 and 704 may include any suitable conductive or semiconductive material. For example, the first and second electrodes 702 and 704 may include carbon contaminated plastic. In some implementations, the electrical conductivity of the first and second electrodes 702 and 704 may be low so that small changes in finger position along the length of the touch-sensitive retention clip 700 produce measurable changes in resistance.

In the depicted implementation, the first and second electrodes 702 and 704 are separated by an isolating material 706. In other implementations, the first and second electrodes 702 and 704 may be physically spaced apart from one another such that the first and second electrodes 702 and 704 are not connected.

The first and second electrodes 702 and 704 are electrically connected to a resistive sensor 708 configured to measure a resistance between the first and second electrodes 702 and 704. The resistance measured by the resistive sensor 708 varies based on finger touch input along the length of the first and second electrodes 702 and 704. For example, the measured resistance increases as the finger moves away from the restive sensor 708 and towards the isolating material 706. In this manner, variable touch input information may be provided based on a position of a finger along the length of the touch-sensitive retention clip 700.

Figure 8:
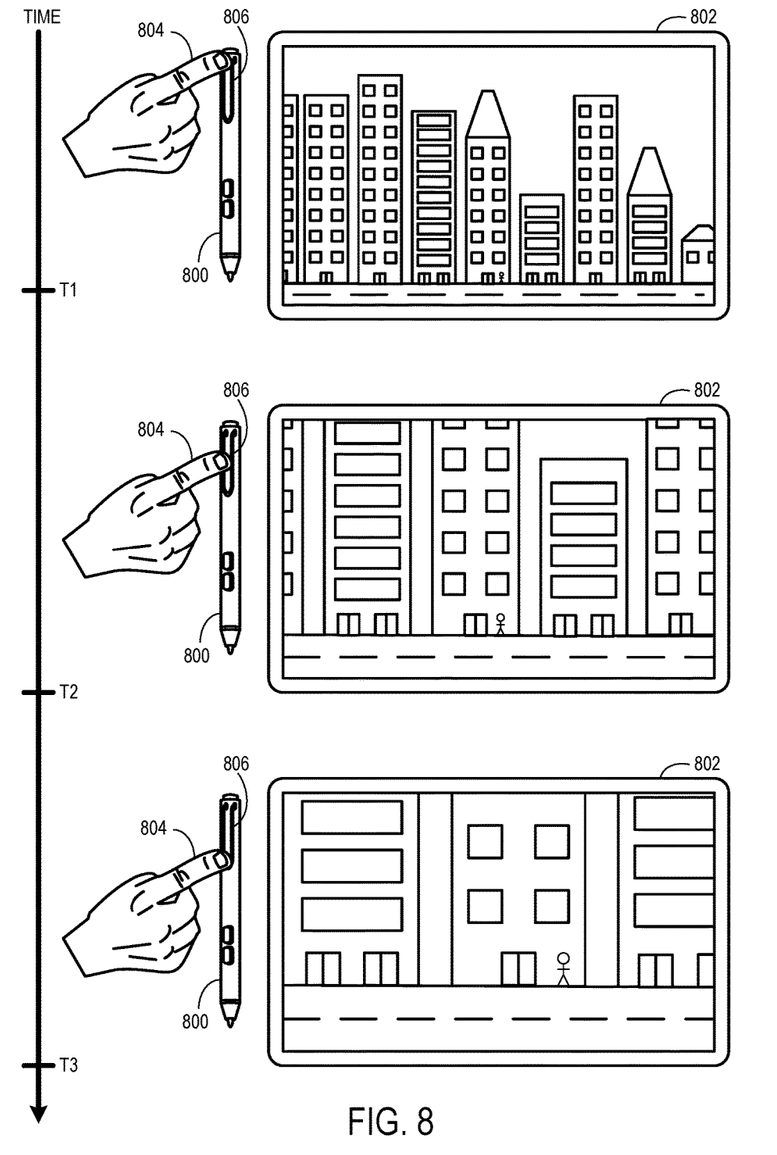
FIG. 8 shows a scenario in which zooming functionality is enabled via touch input to a touch-sensitive retention clip of a stylus.
Figure 9:
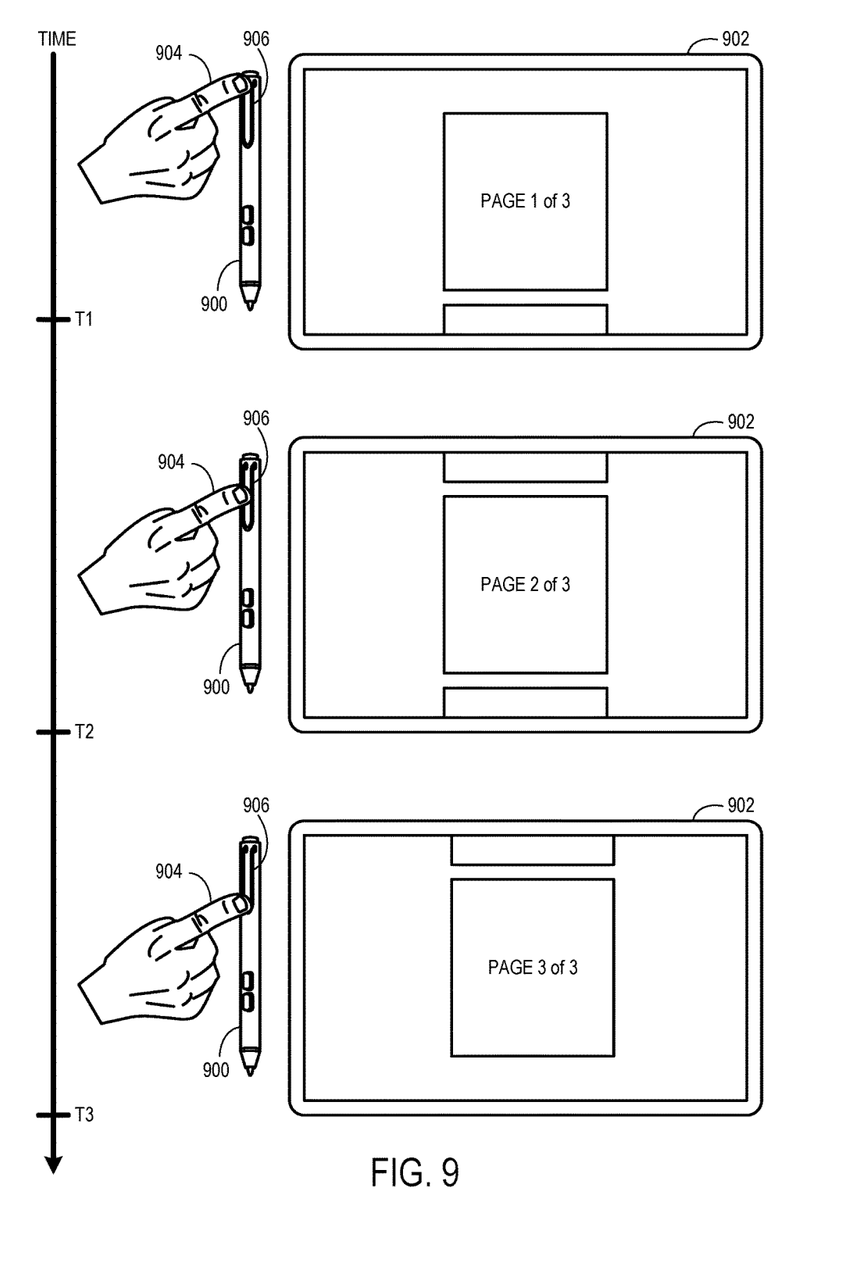
FIG. 9 shows a scenario in which scrolling functionality is enabled via touch input to a touch-sensitive retention clip of a stylus.

The information sent from the stylus to the computing device based on the position or movement of the finger along the length of the touch-sensitive retention clip may be associated with any suitable functionality, control commands, or other computing operations. FIGS. 8 and 9 show different scenarios in which touch input to a touch-sensitive retention clip of a stylus enable different computing functionality.

FIG. 8 shows a scenario in which zooming functionality is enabled via touch input to a touch-sensitive retention clip of a stylus 800. The stylus 800 is in communication with a display device 802. The display device 802 visually presents a scene of a city landscape.

At time T1, a finger 804 applies touch input to a first—i.e., "top" position of a touch-sensitive retention clip 806. The stylus 800 sends information to the display device 802 based on the finger 804 being at the top position of the touch-sensitive retention clip 806. In some implementations, the stylus 800 can process the information to determine a gesture (e.g., scroll direction and speed), and send the gesture to the display device 802. The display device 802 associates the received information with a low zoom level operation, and the display device 802 visually presents the city landscape with a perspective corresponding to the low zoom level operation.

At time T2, the finger 804 slides down and applies touch input to a second—i.e., "middle" position of the touch-sensitive retention clip 806. The stylus 800 sends information to the display device 802 based on the finger 804 being at the middle position of the touch-sensitive retention clip 806. The display device 802 associates the received information with a medium zoom level operation, and the display device 802 visually presents the city landscape with a perspective corresponding to the medium zoom level operation. In other words, the display device 802 zooms in on the city landscape relative to the perspective visually presented at time T1.

At time T3, the finger 804 slides down and applies touch input to a third—i.e., "bottom" position of the touch-sensitive retention clip 806. The stylus 800 sends information to the display device 802 based on the finger 804 being at the bottom position of the touch-sensitive retention clip 806. The display device 802 associates the received information with a high zoom level operation, and the display device 802 visually presents the city landscape with a perspective corresponding to the high zoom level operation. In other words, the display device 802 zooms in on the city landscape relative to the perspective visually presented at time T2.

This scenario is provided as an example. Zooming functionality may be implemented via the touch-sensitive retention clip 806 in any suitable manner. For example, in another implementation, the finger 804 may apply touch input to the bottom position of the touch-sensitive retention clip 806 to cause the display device to visually present the low zoom level of the city landscape. Further, the finger 804 may slide up the touch-sensitive retention clip 806 to the top position to cause the display device 802 to zoom in on the city landscape. In another example, the finger may slide along the length of the touch-sensitive retention clip 806 repeatedly to effectuate a repeated or extended zoom operation (in a manner similar to repeatedly rotating a scroll wheel of a mouse device).

FIG. 9 shows a scenario in which scrolling functionality is enabled via touch input to a touch-sensitive retention clip of a stylus 900. The stylus 900 is in communication with a display device 902. The display device 902 visually presents pages of a document.

At time T1, a finger 904 applies touch input to a first—i.e., "top" position of a touch-sensitive retention clip 906. The stylus 900 sends information to the display device 902 based on the finger 904 being at the top position of the touch-sensitive retention clip 906. The display device 902 associates the received information with a top scroll position, and the display device 902 visually presents PAGE 1 at the top of the document.

At time T2, the finger 904 slides down and applies touch input to a second—i.e., "middle" position of the touch-sensitive retention clip 906. The stylus 900 sends information to the display device 902 based on the finger 904 being at the middle position of the touch-sensitive retention clip 906. The display device 902 associates the received information with a middle scroll position, and the display device 902 visually presents PAGE 2 in the middle of the document. In other words, the display device 902 scrolls down the document relative to the perspective visually presented at time T1.

At time T3, the finger 904 slides down and applies touch input to a third—i.e., "bottom" position of the touch-sensitive retention clip 906. The stylus 900 sends information to the display device 902 based on the finger 904 being at the bottom position of the touch-sensitive retention clip 906. The display device 902 associates the received information with a bottom scroll position, and the display device 902 visually presents PAGE 3 at the bottom of the document. In other words, the display device 902 scrolls down the document relative to the perspective visually presented at time T2.

This scenario is provided as an example. Scrolling functionality may be implemented via the touch-sensitive retention clip 906 in any suitable manner. For example, in another implementation, the finger 904 may apply touch input to different positions of the touch-sensitive retention clip 906 to cause the display device 902 to scroll in different directions. For example, the finger 904 may apply touch input to the top position of the touch-sensitive retention clip 906 to scroll up, and the finger 904 may apply touch input to the bottom position of the touch-sensitive retention clip 906 to scroll down.

Figure 10:
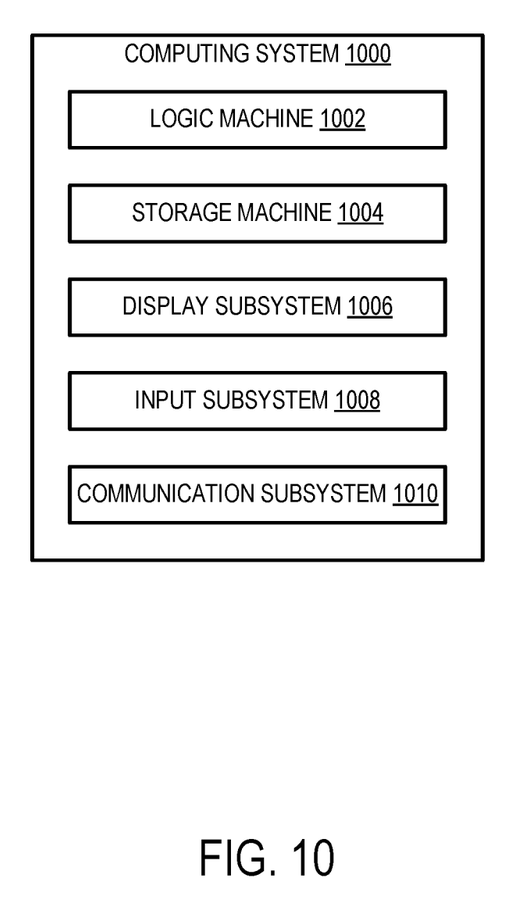
FIG. 10 shows a computing system.

FIG. 10 schematically shows a non-limiting implementation of a computing system 1000 that can enact one or more of the methods and processes described above. Computing system 1000 is shown in simplified form. Computing system 1000 may take the form of one or more stylus controllers, personal computers, server computers, tablet computers, home-entertainment computers, network computing devices, gaming devices, mobile computing devices, mobile communication devices (e.g., smart phone), and/or other computing devices. For example, computing system 1000 is an example of the stylus 100 of FIG. 1, the display device 102 of FIG. 1, and the stylus 200 of FIG. 2, as well as other devices described herein.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine 1002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine 1002 may include one or more hardware or firmware logic machines configured to execute hardware or firmware instructions. Processors of the logic machine 1002 may be single-core or multi-core, and the instructions executed thereon may be configured for sequential, parallel, and/or distributed processing. Individual components of the logic machine 1002 optionally may be distributed among two or more separate devices, which may be remotely located and/or configured for coordinated processing. Aspects of the logic machine 1002 may be virtualized and executed by remotely accessible, networked computing devices configured in a cloud-computing configuration.

Storage machine 1004 includes one or more physical devices configured to hold instructions executable by the logic machine 1002 to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine 1004, and thus transform the state of the storage machine 1004, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some implementations, the input subsystem 1008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem 1010 may be configured for communication via a wireless telephone network, or a wired or wireless local- or wide-area network. In some implementations, the communication subsystem 1010 may allow computing system 1000 to send and/or receive messages to and/or from other devices via a network such as the Internet.

In an example, a stylus comprises an elongate gripping member terminating at a writing tip, a communication interface housed within the elongate gripping member and configured to wirelessly communicate with a computing device, a touch-sensitive retention clip extending from the elongate gripping member, and a controller housed within the elongate gripping member and configured to: detect a position or movement of a finger along a length of the touch-sensitive retention clip, and send to the computing device, via the communication interface, information based on the position or movement of the finger along the length of the touch-sensitive retention clip. In this example, the stylus may further comprise a capacitive sensor electrically connected to the touch-sensitive retention clip, the capacitive sensor being configured to measure a capacitance of the touch-sensitive retention clip, and the controller may be configured to detect the position or movement of the finger along the length of the touch-sensitive retention clip based on the capacitance measured by the capacitive sensor. In this example, the touch-sensitive retention clip may include an interior conductive material and an exterior isolating material, and wherein the capacitive sensor is electrically connected to the interior conductive material. In this example, a thickness of the interior conductive material may change along the length of the touch-sensitive retention clip. In this example, a thickness of the exterior isolating material may vary along the length of the touch-sensitive retention clip. In this example, a width of the interior conductive material may change along the length of the touch-sensitive retention clip. In this example, a shape of the touch-sensitive retention clip may be trapezoidal. In this example, the stylus may further comprise a resistive sensor electrically connected to the touch-sensitive retention clip, the resistive sensor being configured to measure a resistance of the touch-sensitive retention clip, and the controller may be configured to detect the position or movement of the finger along the length of the touch-sensitive retention clip based on the resistance measured by the resistive sensor. In this example, the information may include scroll information. In this example, the information may include zoom information. In this example, the communication interface may include a personal area network transceiver. In this example, the controller may be further configured to: maintain the stylus in a power saving mode in which the stylus does not communicate with the computing device via the communication interface, and switch the stylus from the power saving mode to an active mode in which the stylus communicates with the computing device via the communication interface based on detecting movement of the finger on the touch-sensitive retention clip.

In an example, a stylus comprises an elongate gripping member terminating at a writing tip, a communication interface housed within the elongate gripping member and configured to wirelessly communicate with a computing device, a touch-sensitive retention clip extending from the elongate gripping member, a capacitive sensor electrically connected to the touch-sensitive retention clip, the capacitive sensor being configured to measure a capacitance of the touch-sensitive retention clip, and a controller configured to: detect a position or movement of a finger along a length of the touch-sensitive retention clip based on a capacitance measured by the capacitive sensor, and send to the computing device, via the communication interface, information based on the position or movement of the finger along the length of the touch-sensitive retention clip. In this example, the touch-sensitive retention clip may include an interior conductive material and an exterior isolating material, and the capacitive sensor may be electrically connected to the interior conductive material. In this example, a thickness of the interior conductive material may change along the length of the touch-sensitive retention clip. In this example, a thickness of the exterior isolating material may vary along the length of the touch-sensitive retention clip. In this example, a width of the interior conductive material may change along the length of the touch-sensitive retention clip. In this example, the information may include scroll information. In this example, the information may include zoom information.

In an example, a stylus comprises an elongate gripping member terminating at a writing tip, a communication interface housed within the elongate gripping member and configured to wirelessly communicate with a computing device, a touch-sensitive retention clip extending from the elongate gripping member, the touch-sensitive retention clip including an interior conductive material and an exterior isolating material, and wherein one or more dimensions of the interior conductive material changes along a length of the retention clip, a capacitive sensor electrically connected to the touch-sensitive retention clip the capacitive sensor being configured to measure a capacitance of the touch-sensitive retention clip, and a controller configured to: detect a position or movement of a finger along a length of the touch-sensitive retention clip based on a capacitance measured by the capacitive sensor, and send to the computing device, via the communication interface, information based on the position or movement of the finger along the length of the touch-sensitive retention clip.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A stylus comprising:
an elongate gripping member terminating at a writing tip;
a communication interface housed within the elongate gripping member and configured to wirelessly communicate with a computing device;
a touch-sensitive retention clip extending from the elongate gripping member; and
a controller housed within the elongate gripping member and configured to:
detect a position or movement of a finger along a length of the touch-sensitive retention clip; and
send to the computing device, via the communication interface, information based on the position or movement of the finger along the length of the touch-sensitive retention clip.

2. The stylus of claim 1, further comprising:
a capacitive sensor electrically connected to the touch-sensitive retention clip, the capacitive sensor being configured to measure a capacitance of the touch-sensitive retention clip; and
wherein the controller is configured to detect the position or movement of the finger along the length of the touch-sensitive retention clip based on the capacitance measured by the capacitive sensor.

3. The stylus of claim 2, wherein the touch-sensitive retention clip includes an interior conductive material and an exterior isolating material, and wherein the capacitive sensor is electrically connected to the interior conductive material.

4. The stylus of claim 3, wherein a thickness of the interior conductive material changes along the length of the touch-sensitive retention clip.

5. The stylus of claim 3, wherein a thickness of the exterior isolating material varies along the length of the touch-sensitive retention clip.

6. The stylus of claim 3, wherein a width of the interior conductive material changes along the length of the touch-sensitive retention clip.

7. The stylus of claim 6, wherein a shape of the touch-sensitive retention clip is trapezoidal.

8. The stylus of claim 1, further comprising:
a resistive sensor electrically connected to the touch-sensitive retention clip, the resistive sensor being configured to measure a resistance of the touch-sensitive retention clip; and
wherein the controller is configured to detect the position or movement of the finger along the length of the touch-sensitive retention clip based on the resistance measured by the resistive sensor.

9. The stylus of claim 1, wherein the information includes scroll information.

10. The stylus of claim 1, wherein the information includes zoom information.

11. The stylus of claim 1, wherein the communication interface includes a personal area network transceiver.

12. The stylus of claim 1, wherein the controller is configured to:
maintain the stylus in a power saving mode in which the stylus does not communicate with the computing device via the communication interface; and
switch the stylus from the power saving mode to an active mode in which the stylus communicates with the computing device via the communication interface based on detecting movement of the finger on the touch-sensitive retention clip.

13. A stylus comprising:
an elongate gripping member terminating at a writing tip;
a communication interface housed within the elongate gripping member and configured to wirelessly communicate with a computing device;
a touch-sensitive retention clip extending from the elongate gripping member;
a capacitive sensor electrically connected to the touch-sensitive retention clip, the capacitive sensor being configured to measure a capacitance of the touch-sensitive retention clip; and
a controller configured to:
detect a position or movement of a finger along a length of the touch-sensitive retention clip based on a capacitance measured by the capacitive sensor; and
send to the computing device, via the communication interface, information based on the position or movement of the finger along the length of the touch-sensitive retention clip.

14. The stylus of claim 13, wherein the touch-sensitive retention clip includes an interior conductive material and an exterior isolating material, and wherein the capacitive sensor is electrically connected to the interior conductive material.

15. The stylus of claim 14, wherein a thickness of the interior conductive material changes along the length of the touch-sensitive retention clip.

16. The stylus of claim 14, wherein a thickness of the exterior isolating material varies along the length of the touch-sensitive retention clip.

17. The stylus of claim 14, wherein a width of the interior conductive material changes along the length of the touch-sensitive retention clip.

18. The stylus of claim 13, wherein the information includes scroll information.

19. The stylus of claim 13, wherein the information includes zoom information.

20. A stylus comprising:
an elongate gripping member terminating at a writing tip;
a communication interface housed within the elongate gripping member and configured to wirelessly communicate with a computing device;
a touch-sensitive retention clip extending from the elongate gripping member, the touch-sensitive retention clip including an interior conductive material and an exterior isolating material, and wherein one or more dimensions of the interior conductive material changes along a length of the retention clip;
a capacitive sensor electrically connected to the touch-sensitive retention clip the capacitive sensor being configured to measure a capacitance of the touch-sensitive retention clip; and
a controller configured to:
detect a position or movement of a finger along a length of the touch-sensitive retention clip based on a capacitance measured by the capacitive sensor; and
send to the computing device, via the communication interface, information based on the position or movement of the finger along the length of the touch-sensitive retention clip.

* * * * *